US012681897B2

(12) United States Patent
Ikeda

(10) Patent No.: US 12,681,897 B2
(45) Date of Patent: Jul. 14, 2026

(54) IMAGE PROCESSING APPARATUS AND IMAGE PROCESSING METHOD

(71) Applicant: CANON KABUSHIKI KAISHA, Tokyo (JP)

(72) Inventor: Kaori Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/753,879

(22) Filed: Jun. 25, 2024

(65) Prior Publication Data

US 2025/0004989 A1     Jan. 2, 2025

(30) Foreign Application Priority Data

Jun. 29, 2023     (JP) ................................. 2023-107224

(51) Int. Cl.
*G06F 16/10* (2019.01)
*G06F 3/0482* (2013.01)
*G06F 16/16* (2019.01)

(52) U.S. Cl.
CPC .......... *G06F 16/168* (2019.01); *G06F 3/0482* (2013.01)

(58) Field of Classification Search
CPC ............................ G06F 16/168; G06F 3/0482
USPC ................................. 707/822, 825, 781, 782
See application file for complete search history.

(56) References Cited

U.S. PATENT DOCUMENTS

| | | | | | |
|---|---|---|---|---|---|
| 8,213,741 | B2 * | 7/2012 | Sundareson | ........... | G06V 10/25 |
| | | | | | 715/838 |
| 9,324,158 | B2 * | 4/2016 | Nakano | ................. | G06V 40/23 |

| | | | | | |
|---|---|---|---|---|---|
| 10,460,196 | B2 * | 10/2019 | Dhawan | ............... | G06V 10/771 |
| 11,580,644 | B2 * | 2/2023 | Saito | ......................... | G06T 7/10 |
| 2003/0161535 | A1 * | 8/2003 | Kohno | .............. | G06V 10/7515 |
| | | | | | 382/215 |
| 2003/0227551 | A1 * | 12/2003 | Kudo | ..................... | H04N 5/772 |
| | | | | | 348/207.99 |
| 2005/0036712 | A1 * | 2/2005 | Wada | ................. | G06V 10/7515 |
| | | | | | 707/999.003 |
| 2010/0158409 | A1 * | 6/2010 | Sundareson | ........... | G06V 10/25 |
| | | | | | 382/282 |
| 2011/0231763 | A1 * | 9/2011 | Sakaguchi | ............. | H04N 5/915 |
| | | | | | 715/720 |
| 2013/0094832 | A1 * | 4/2013 | Ishihara | ................. | G11B 27/34 |
| | | | | | 386/230 |
| 2015/0249789 | A1 * | 9/2015 | Morimoto | ......... | H04N 1/00413 |
| | | | | | 348/231.2 |
| 2018/0277161 | A1 * | 9/2018 | Eronen | ................ | G11B 27/102 |
| 2019/0073081 | A1 * | 3/2019 | Takahashi | ........... | G06F 3/04845 |
| 2021/0012501 | A1 * | 1/2021 | Saito | ................... | G06F 3/04842 |

FOREIGN PATENT DOCUMENTS

| | | |
|---|---|---|
| JP | 2012138679 A | 7/2012 |
| WO | WO2022/104181 A1 * | 5/2022 |

* cited by examiner

*Primary Examiner* — Daniel A Kuddus

(74) *Attorney, Agent, or Firm* — Canon U.S.A., Inc. IP Division

(57) ABSTRACT

An image processing apparatus obtains information relating to each of a plurality of data files that have been recorded. The apparatus then generates, based on the information, a selection screen for selecting a data file from the plurality of data files. The selection screen is generated so as to display, a plurality of data files that jointly store continuous moving image data, as a single data file.

14 Claims, 9 Drawing Sheets

100
(image capture apparatus)

200
(mobile device)

300
(server)

F I G. 3
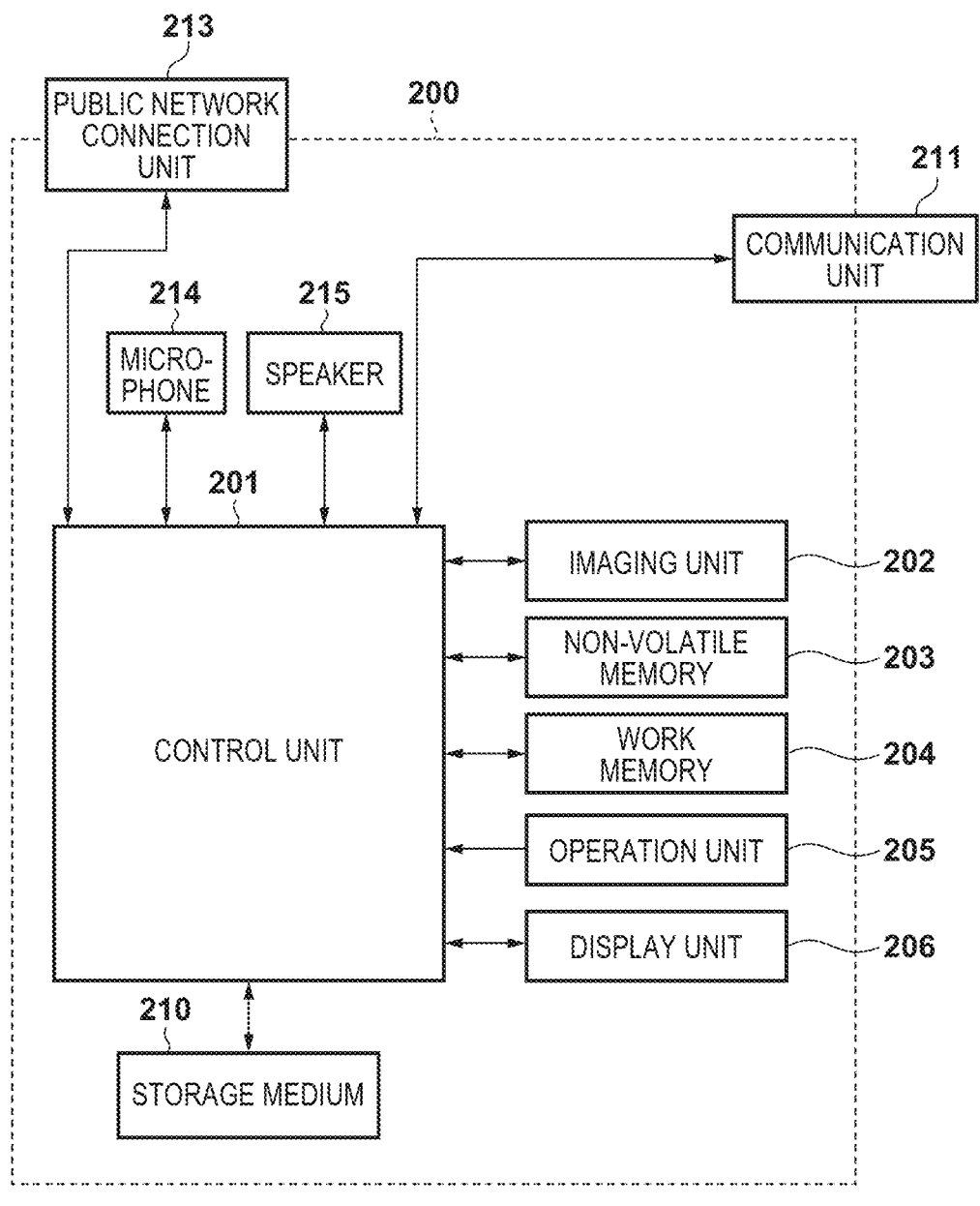

F I G. 4A

| FILE NAME 401 | SHOOTING DATE AND TIME 402 | FILE SIZE 403 | RECORDING TIME 404 | GROUP ID 405 |
|---|---|---|---|---|
| MVIB0001.MP4 | 2023.01.02 09:30:20 | 100 MB | 00:30 | — |
| MVIB0002.MP4 | 2023.01.02 09:30:50 | 100 MB | 00:30 | — |
| MVIB0003.MP4 | 2023.01.02 09:31:20 | 100 MB | 00:30 | — |
| MVIB0004.MP4 | 2023.01.02 09:31:50 | 79 MB | 00:25 | — |

F I G. 4B

| FILE NAME 401 | SHOOTING DATE AND TIME 402 | FILE SIZE 403 | RECORDING TIME 404 | GROUP ID 405 |
|---|---|---|---|---|
| IMG_0005.JPG | 2023.01.02 09:43:11 | 5.3 MB | — | continu_001 |
| IMG_0006.JPG | 2023.01.02 09:43:12 | 5.5 MB | — | continu_001 |
| IMG_0007.JPG | 2023.01.02 09:43:13 | 5.5 MB | — | continu_001 |

F I G. 4C

| FILE NAME | SHOOTING DATE AND TIME | FILE SIZE | RECORDING TIME | GROUP ID |
|---|---|---|---|---|
| MVI_0010_01.MP4 | 2023.01.02 10:35:00 | 3.95 GB | 04:40 | — |
| MVI_0010_02.MP4 | 2023.01.02 10:39:40 | 3.95 GB | 04:40 | — |
| MVI_0010_03.MP4 | 2023.01.02 10:44:21 | 3.95 GB | 04:41 | — |
| MVI_0010_04.MP4 | 2023.01.02 10:48:00 | 3.09 GB | 03:39 | — |

401   402   403   404   405

F I G. 4D

| FILE NAME | SHOOTING DATE AND TIME | FILE SIZE | RECORDING TIME | GROUP ID |
|---|---|---|---|---|
| IMG_0021.JPG | 2023.01.02 11:05:00 | 5.8 MB | — | — |
| IMG_0022.JPG | 2023.01.02 11:05:05 | 5.6 MB | — | — |
| MVI_0023.MP4 | 2023.01.02 11:06:10 | 2.2 GB | 02:30 | — |
| MVI_0024.MP4 | 2023.01.02 11:08:14 | 505 MB | 00:35 | — |

401   402   403   404   405

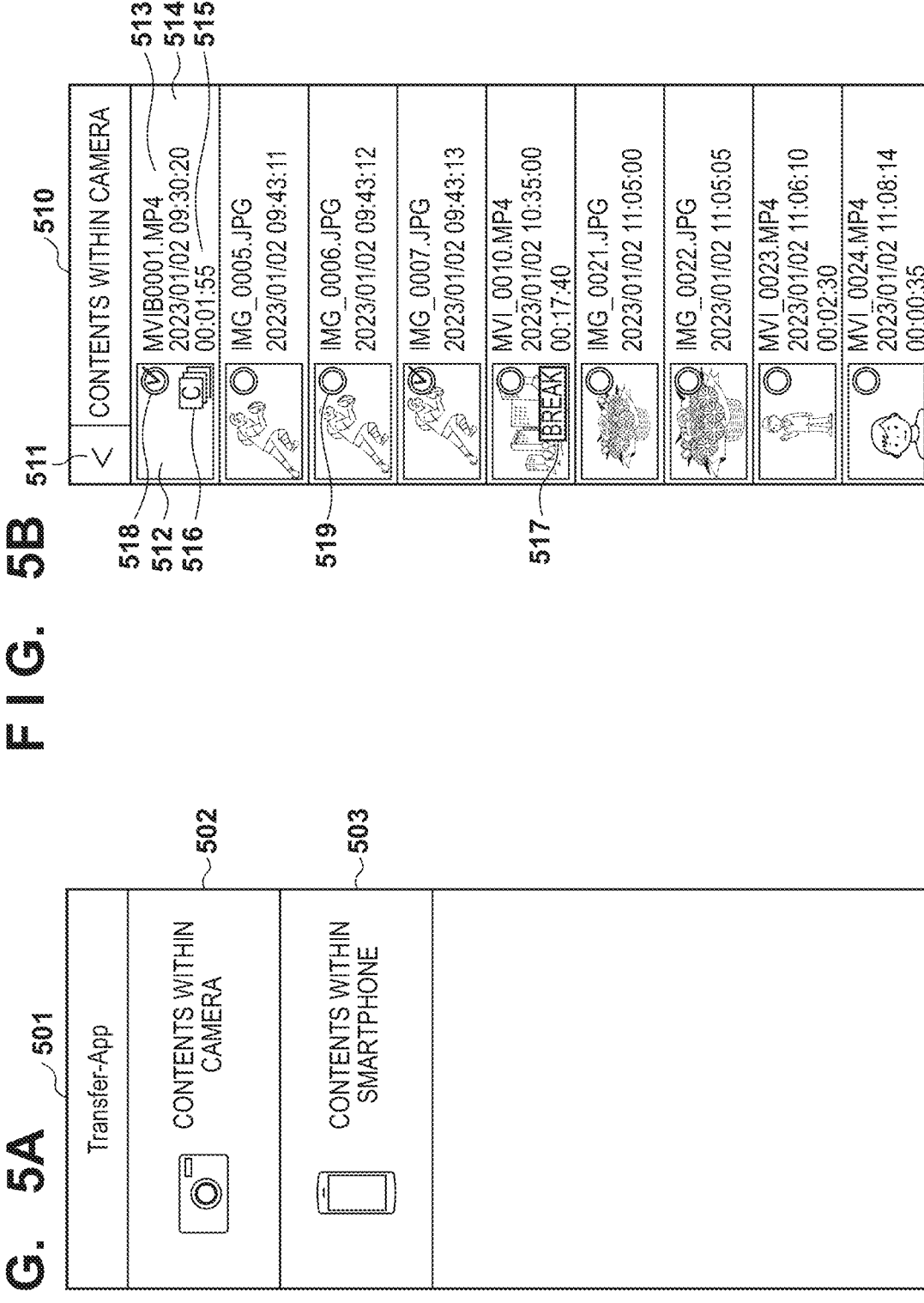
F I G. 5A
F I G. 5B

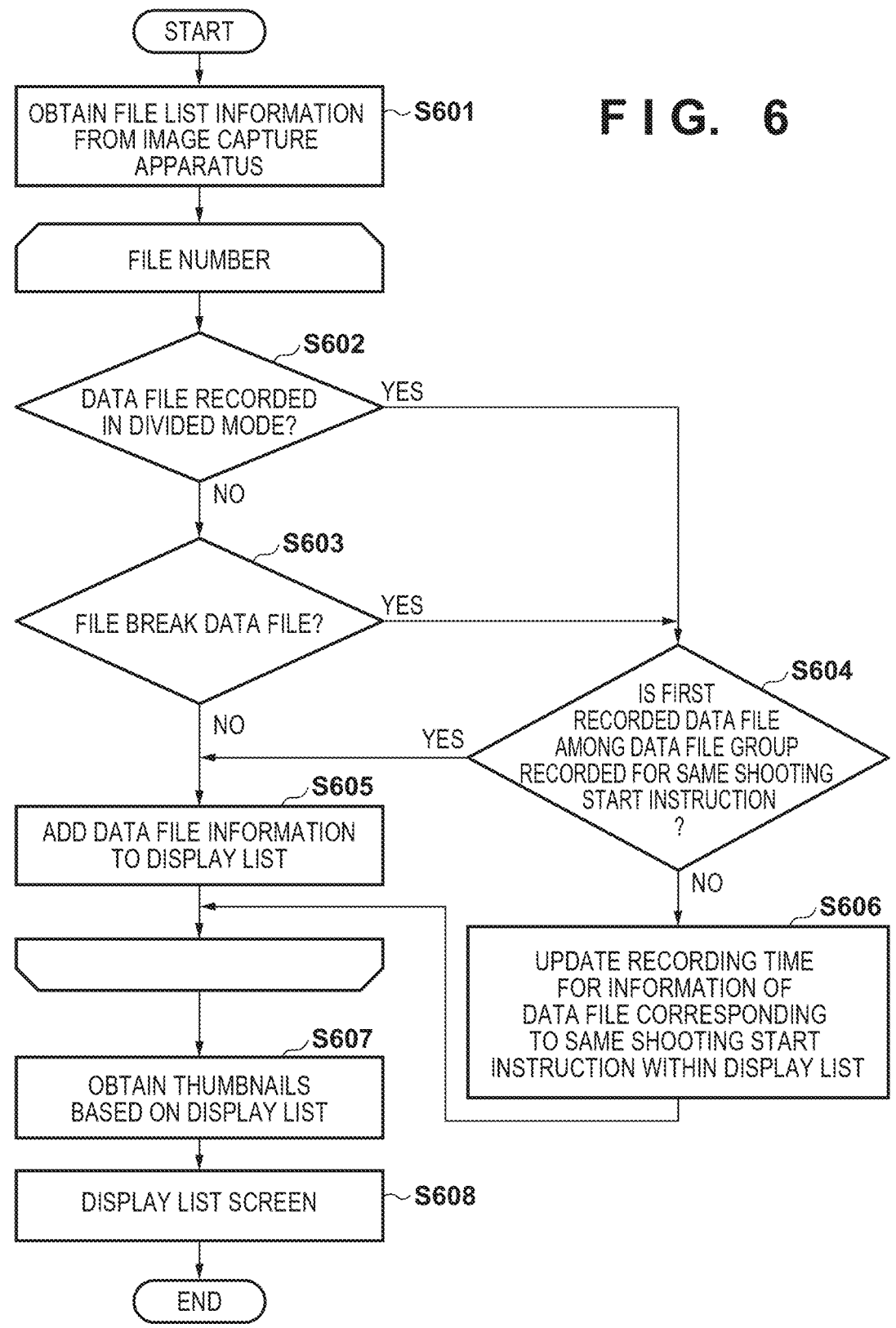
F I G. 6

F I G. 7

| DISPLAY NAME | SHOOTING DATE AND TIME | RECORDING TIME | DISPLAY TYPE |
|---|---|---|---|
| MVIB0001.MP4 | 2023.01.02 09:30:20 | 01:55 | CHUNK FILE |
| IMG_0005.JPG | 2023.01.02 09:43:11 | — | — |
| IMG_0006.JPG | 2023.01.02 09:43:12 | — | — |
| IMG_0007.JPG | 2023.01.02 09:43:13 | — | — |
| MVI_0010.MP4 | 2023.01.02 10:35:00 | 17:40 | FILE BREAK |
| IMG_0021.JPG | 2023.01.02 11:05:00 | — | — |
| IMG_0022.JPG | 2023.01.02 11:05:05 | — | — |
| MVI_0023.MP4 | 2023.01.02 11:06:10 | 02:30 | — |
| MVI_0024.MP4 | 2023.01.02 11:08:14 | 01:25 | — |

701    702    703    704

IMAGE PROCESSING APPARATUS AND IMAGE PROCESSING METHOD

BACKGROUND OF THE DISCLOSURE

Field of the Disclosure

The present disclosure relates to an image processing apparatus and an image processing method and particularly relates to data file handling technology.

Description of the Related Art

A known technique makes it easier for a user to find a desired image by grouping a plurality of continuously shot still images on the basis of the image with the largest degree of change from the one previous image in terms of shooting timing and displaying a representative image of each group (Japanese Patent Laid-Open No. 2012-138679).

The method proposed in Japanese Patent Laid-Open No. 2012-138679 can be suitably applied to finding an image with a large change in the shooting scene during continuous shooting, for example. However, in Japanese Patent Laid-Open No. 2012-138679, there is no mention of how to handle a plurality of data files each storing data of a different part of a continuous moving image.

SUMMARY OF THE DISCLOSURE

The present disclosure has been made in consideration of the aforementioned issues with known techniques, and an aspect of the present disclosure provides an image processing apparatus and an image processing method enabling appropriate management of a plurality of data files including a plurality of data files each storing data of a different part of a continuous moving image.

According to an aspect of the present disclosure, there is provided an image processing apparatus that comprises one or more processors executing a program stored in a memory and thereby function as: an obtaining unit configured to obtain information relating to each of a plurality of data files that have been recorded; and a generation unit configured to generate, based on the information, a selection screen for selecting a data file from the plurality of data files, wherein the generation unit generates the selection screen so as to display, a plurality of data files that jointly store continuous moving image data, as a single data file.

According to another aspect of the present disclosure, there is provided an image processing method executed by an image processing apparatus comprising: obtaining information relating to each of a plurality of data files that have been recorded; and generating, based on the information, a selection screen for selecting a data file from the plurality of data files, wherein the generating generates the selection screen so as to display, a plurality of data files that jointly store continuous moving image data, as a single data file.

Further features of the present disclosure will become apparent from the following description of exemplary embodiments (with reference to the attached drawings).

BRIEF DESCRIPTION OF THE DRAWINGS

FIG. 3 is a block diagram illustrating an example of the functional configuration of a smartphone according to the embodiment.

FIGS. 4A to 4D are diagrams illustrating examples of file information recorded by the image capture apparatus according to the embodiment.

FIGS. 5A and 5B are diagrams illustrating examples of screens of an application executed by the smartphone according to the embodiment.

FIG. 6 is a flowchart relating to the operations of the smartphone according to the embodiment.

FIG. 7 is a diagram illustrating an example of a display list generated by the smartphone according to the embodiment.

DESCRIPTION OF THE EMBODIMENTS

Figure 1:
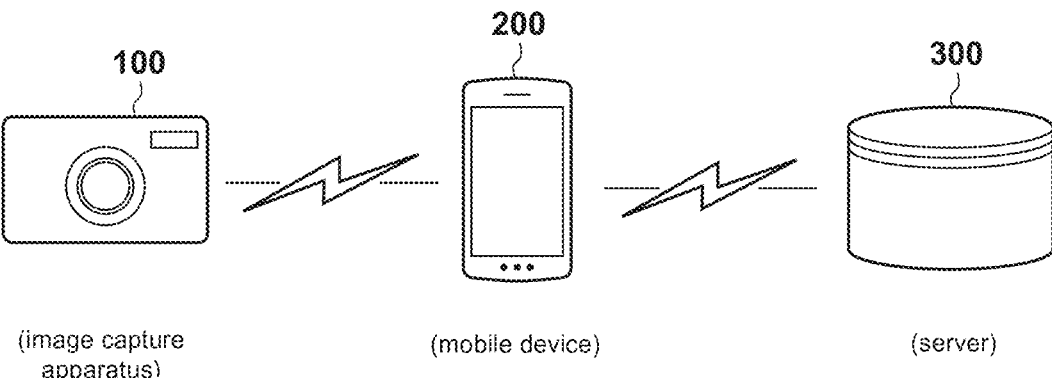
FIG. 1 is a schematic view illustrating an example configuration of an imaging system according to an embodiment.

Hereinafter, embodiments will be described in detail with reference to the attached drawings. Note, the following embodiments are not intended to limit the scope of the present disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Note that in the embodiments described below, the present disclosure is implemented as a smartphone. However, the present disclosure can be implemented as any electronic device capable of managing image data. Examples of such an electronic apparatus include image capture apparatuses, computer devices (personal computers, tablet computers, media players, PDAs, and the like), game consoles, and the like. These are examples, and the present disclosure can be implemented as other electronic devices.

System Configuration

FIG. 1 is a schematic view of an imaging system that transfers data files generated by an image capture apparatus 100 to a server 300 via a smartphone 200, which is an example of an image processing apparatus according to the embodiment, and accumulating the data files at the server 300. Note that the present disclosure can be implemented as the smartphone 200 by itself, and the image capture apparatus 100 and the server 300 are not required components. FIG. 1 illustrates an example of the environment for implementing the present disclosure using the smartphone 200, but no limitation to the environment for implementing the present disclosure is intended.

The image capture apparatus 100 and the smartphone 200 can communicated with one another via a wired connection or a wireless connection. Also, the server 300 is an information processing apparatus that is accessible via the Internet, for example. The smartphone 200 can communicate with the server 300 via a public telephone network, for example.

Note that the devices may be connected in a different manner to that illustrated in FIG. 1. For example, the image capture apparatus 100, the smartphone 200, and the server 300 may connect to the same wireless LAN access point. Any method of connecting the devices can be used as long as data files can be transmitted from the image capture apparatus 100 to the server 300 and the smartphone 200 and the image capture apparatus 100 can communicate with one another.

Example Configuration of Image Capture Apparatus 100

Figure 2A:
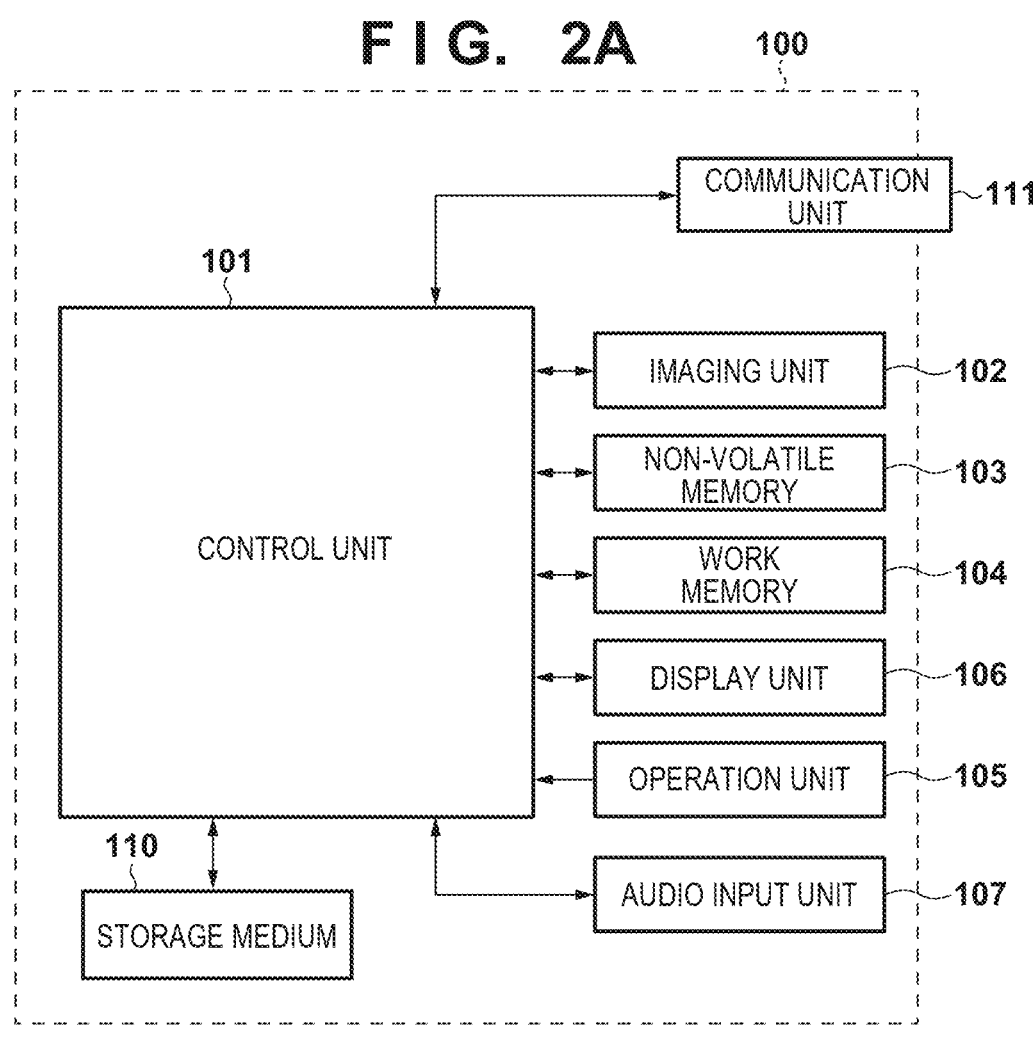
FIGS. 2A to 2C are diagrams illustrating an example of the functional configuration and the external appearance of an image capture apparatus according to the embodiment.
Figures 2B, 2C:
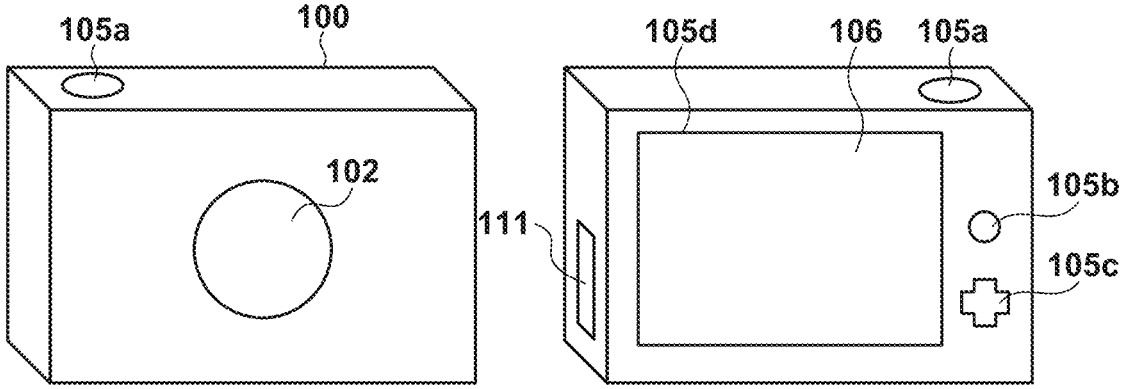

FIG. 2A is a block diagram illustrating an example functional configuration of the image capture apparatus 100. Also, FIGS. 2B and 2C are perspective views illustrating an example of the external appearance of the image capture apparatus 100. FIG. 2B is a front view of the external appearance example, and FIG. 2C is a back view of the external appearance example.

A control unit 101 includes one or more processors (hereinafter, referred to as a CPU) that can execute programs and loads programs stored in a non-volatile memory 103 on a work memory 104 and executes them, for example. The control unit 101 controls the operation of each functional block by executing a program and implements the functions of the image capture apparatus 100.

The non-volatile memory 103, which may be rewritable, stores programs executable by the CPU of the control unit 101, setting values of the image capture apparatus 100, GUI data, and the like. Note that the operations of the image capture apparatus 100 described below are implemented by the CPU of the control unit 101 executing a program stored in the non-volatile memory 103.

The work memory 104 is a volatile memory, for example, and is used to load a program to be executed by the CPU of the control unit 101 and to store values necessary during execution of the program. Also, a portion of the work memory 104 may be used as the display memory of a display unit 106.

An operation unit 105 is a generic term for an input device provided on the image capture apparatus 100. The operation unit 105 may include, but is not limited to including, a touch panel 105*d* provided on the display unit 106, a play button 105*b*, a power switch, a release switch 105*a*, a shoot moving image button, a directional key 105*c*, a settings button, a menu button, and the like. When the control unit 101 detects an operation of the operation unit 105, an operation corresponding to the detected operation is executed.

The control unit 101 recognizes a half-pressed state of the release switch 105*a* as a shooting preparation instruction and a fully-pressed state as a shooting start instruction. When the control unit 101 recognizes a shooting preparation instruction, automatic focus detection (AF) processing and/or automatic exposure control (AE) are executed. Also, when the control unit 101 recognizes a shooting start instruction, still image capturing processing is executed, and the data file storing the still image data is stored in a storage medium 110.

The control unit 101 recognizes the operation of the shoot moving image button in a shooting standby state as a start recording instruction for moving images and stores the data file storing the moving image data in the storage medium 110. Also, the control unit 101 recognizes the operation of the shoot moving image button while recording moving images as a stop recording instruction and stops recording moving image data.

Note that in the shooting standby state, the mode is already set to the still image mode or the moving image mode. In this case, when the control unit 101 detects an operation of the release switch 105*a*, for example, in the case of the still image mode, shooting and recording of still images is performed, and in the case of the moving image mode, recording of moving images is performed.

An imaging unit 102 is a camera unit including an imaging optical system, an image sensor, and the like. The image sensor may be a known complementary metal-oxidesemiconductor (CMOS) image sensor, for example. The image sensor includes a pixel array including a plurality of pixels in a two-dimensional array and a peripheral circuit for reading signals from the pixels. Each pixel accumulates a charge corresponding to the amount of incident light via photoelectric conversion. By reading a signal including voltage corresponding to the amount of charge accumulated in the exposure period from each pixel, the pixel signal group (analog image signal) representing the object image formed on the imaging surface is obtained.

The imaging unit 102 generates a digital image signal (image data) by A/D converting an analog image signal. Also, the imaging unit 102 applies various types of image processing to the image data to generate image data for display and image data for storing. The imaging unit 102 stores the generated image data in the work memory 104. The imaging unit 102 stores the image data for display in an area of the work memory 104 used for video memory.

The control unit 101 generates an image data file storing the image data for storing. The control unit 101 stores the image data file in the storage medium 110, for example. The control unit 101 combines an image indicating information such as the current setting values and the like and the image data for display stored in the video memory area of the work memory 104 and displays this on the display unit 106.

By displaying captured moving images on the display unit 106 as they are captured by the imaging unit 102, the display unit 106 can be caused to function as an electronic viewfinder (EVF). A moving image that is displayed to cause the display unit 106 to function as an EVF is referred to as a live view image.

The image capture apparatus 100 can shoot and record still images and moving images. Whether to record still images or to record moving images is determined by the set recording mode or by the type of the operation member used for the shooting start instruction.

Also, a single shooting mode and a continuous shooting mode can be selectively set as the recording mode for still images. When single shooting mode is set, the control unit 101 controls each block so that one (one frame) still image is shot and recorded each time a new shooting instruction is detected. When continuous shooting mode is set, the control unit 101 controls each block so that still images are continuously shot and recorded while a shooting instruction is continuously detected (while the release switch 105*a* stays in the fully-pressed state, for example). In this manner, in the continuous shooting mode, a plurality of data files storing still image data may be stored per one shooting instruction.

The shooting period for the continuous shooting mode is typically a few seconds, and a plurality of still images are shot within one second. Thus, the similarity between the plurality of images recorded for one shooting instruction in the continuous shooting mode is high. The user may often select a preferable image to use from among the plurality of images recorded in the continuous shooting mode on the basis of the state of the subject (expression or blur amount, for example), the degree of focus, and the like.

Also, a normal mode and a divided mode can be selectively set as the recording mode for moving images. In a case where the normal mode is set, the control unit 101 records and stores the moving image data in one data file as long as the data file capacity has not reached the upper limit for file management. In a case where the divided mode is set, the control unit 101 records the moving image data in a divided plurality of data files according to a predetermined dividing condition. The dividing condition may be a certain recording time or data amount, for example. The dividing condition may be able to be set by the user within a predetermined range. The recording time can be measured on the basis of a clock signal used in the operations of the control unit 101 or can be measured using a built-in timer of the image capture apparatus 100, for example.

For example, the dividing condition may be a recording time of 30 seconds. In this case, the control unit 101, in response to a moving image shooting start instruction, starts generating a moving image data for recording and starts storing the moving image data file in the storage medium 110. The control unit 101 continues recording into the same data file until 30 seconds has elapsed since the start of recording or a shooting stop instruction is received. When a recording time of 30 seconds is reached, the control unit 101 finishes recording to the first data file.

Also, the control unit 101 generates a second data file in the storage medium 110 and starts recording the moving image data to the second data file. Thereafter, every time a recording time of 30 seconds elapses, the control unit 101 finishes recording to the current data file and continues recording the moving image data to the newly generated data file. Hereinafter, each of the one or more data files generated in the divided mode for storing a continuous moving image is referred to as a chunk file. Excluding the last generated chunk file, each chunk file stores moving image data of a certain amount (a certain recording time or data amount).

By recording in divided mode, the data files (chunk files) finished recording can be transferred to an external device such as the smartphone 200 or the server 300 while moving image shooting and recording is continued. Thus, compared to starting the transfer of data files after the end of moving image shooting, the amount of time taken until the transfer of moving image data is completed can be reduced. At the transfer destination, all of the chunk files are typically combined into one data file in the order of recording in order to generate chunk files with the main purpose of increasing transfer speed.

Each recording mode can be set at any timing before the start of recording via the operation of a menu screen using the operation unit 105, via the operation of a settings member of the recording mode, or the like.

Note that even in a case where the moving image recording mode is set to normal mode, if the size of the data file storing the moving image data is greater than the upper limit set by the file system of the storage destination, the one continuous moving image is (divided and) stored across a plurality of data files. In the case of a FAT16 file system for the storage medium 110, the upper limit is 2 GB, and in the case of a FAT32 file system, the upper limit is 4 GB. In the present specification, division of a data file into data files due to a file system limitation is referred to as file break. The file break occurs irrespective of the user's intent.

Each data file of a plurality of file broken data files is the same as a chunk file in terms of a plurality of data files each storing a different part of a continuous moving image. Thus, in the present specification, a chunk file or each of divided files due to file break is treated as a data file that stores a different part of continuous moving image data. In other words, chunk files recorded in the divided mode or a plurality of data files recorded in the normal mode with file break jointly store continuous moving image data.

Returning to FIG. 2A, the display unit 106 is used to display images shot by the imaging unit 102, images stored in the storage medium 110, menu screens, and the like. Note that an external display apparatus may be able to connect to the image capture apparatus 100. In the present embodiment, the display unit 106 is a touch display provided with the touch panel 105d.

An audio input unit 107 is a microphone, for example. When shooting moving images, the audio input unit 107 is turned on to record the audio of the surroundings. The control unit 101 applies the necessary signal processing to the audio signals input from the audio input unit 107 and generates moving image data corresponding to the recording format. Note that the control unit 101 may turn on the audio input unit 107 when recording audio data at times other than when shooting moving images.

The storage medium 110 is provided separate from the non-volatile memory 103 and is a detachable semiconductor memory card, for example. The storage medium 110 is used as a storage destination for the data file generated by the control unit 101, for example. The data file may be a still image data file, a moving image (with audio) data file, or an audio data file, for example.

A communication unit 111 is a communication interface. The image capture apparatus 100 can communicate with an external device using the communication unit 111. The operations of the communication unit 111 are controlled by the control unit 101. The communication unit 111 performs communication with an external apparatus that is compliant with one or more of a known wired communication standard and wireless communication standard. The communication unit 111 includes a circuit (antenna, connector, transceiver, and the like) according to the compliant communication standard.

In the present embodiment, for example, the communication unit 111 includes a wireless communication interface compliant with the wireless LAN (IEEE 802.11 series) standard and a wired communication interface compliant with the USB standard. Note that the standards that the communication unit 111 is compliant with are not limited to these examples.

Also, the communication unit 111 performs communication via the wireless LAN standard in the infrastructure mode. Also, the communication unit 111 includes an AP mode for operating as an access point (AP) and a client mode for operating as a client. Note that when the communication unit 111 operates in AP mode, the communication unit 111 operates as a simple AP without a function (gateway function) for transferring data to an external network.

When the communication unit 111 operates in AP mode, an external device such as the smartphone 200 connects to the communication unit 111 (AP) to enable communication with the image capture apparatus 100. Also, when the communication unit 111 operates in client mode, the image capture apparatus 100 connects to an external device (AP) such as the smartphone 200 to enable communication with the external device. Note that the image capture apparatus 100 and the external device may connect to a common AP to enable communication between the image capture apparatus 100 and the external device. A program for the communication unit 111 to operate in AP mode and client mode is stored in the non-volatile memory 103.

Example Configuration of Smartphone 200

FIG. 3 is a block diagram illustrating an example functional configuration of the smartphone 200.

A control unit 201 includes one or more processors (hereinafter, referred to as a CPU) that can execute programs and loads programs stored in a non-volatile memory 203 on a work memory 204 and executes them, for example. The control unit 201 controls the operation of each functional block by executing a program and implements the functions of the smartphone 200.

An imaging unit 202 is a camera unit including an imaging optical system, an image sensor, and the like. The imaging unit 202, in accordance with control by the control unit 201, shoots images and stores the obtained image data in the work memory 204. The control unit 201 applies predetermined image processing to the image data and generates an image data file. The control unit 201 stores the image data file in a storage medium 210, for example.

The non-volatile memory 203, which may be rewritable, stores programs (basic software (OS), applications, and the like) executable by the CPU of the control unit 201, setting values for the smartphone 200 and applications, user data, and the like. Also, the non-volatile memory 203 stores information necessary for communication with the image capture apparatus 100 and the server 300. For example, the non-volatile memory 203 stores information (SSIDs and passwords) necessary for connecting to an AP when the communication unit 111 of the image capture apparatus 100 is operating in AP mode. Login information, such as user IDs and passwords, for the server 300 can also be stored as necessary.

Note that the operations of the smartphone 200 described below are implemented by an application (image transfer application) stored in the non-volatile memory 203 being executed. Note that the image transfer application can use the functions provided by the OS as appropriate. For example, the OS may provide basic functions relating to wireless communication with an external apparatus compliant with a specific wireless communication standard including confirming the existence of an external apparatus, establishing and disconnecting a wireless connection (link) with an external apparatus, and the like.

The work memory 204 is a volatile memory, for example, and is used to load a program to be executed by the CPU of the control unit 201 and to store values necessary during execution of the program. Also, a portion of the work memory 204 may be used as the display memory of a display unit 206.

An operation unit 205 is a generic term for an input device provided in the smartphone 200. The operation unit 205 may include, but is not limited to including, a touch panel provided on the display unit 206, a power switch, a volume adjustment button, and the like. When the control unit 201 detects an operation of the operation unit 205, an operation corresponding to the detected operation is executed. When a tap operation on an application icon being displayed is detected, for example, the control unit 201 runs the application corresponding to the icon or returns the application to an active state.

The display unit 206 is a display apparatus and is a touch display in this example. A screen provided by the OS or application is displayed on the display unit 206. Note that an external display apparatus may be able to connect to the smartphone 200.

The storage medium 210 may be a semiconductor memory card, for example. The storage medium 210 is used as the storage destination of data files received from the image capture apparatus 100, for example. Note that the storage medium 210 may be used as a part of the non-volatile memory 203 (for expanding the capacity of the non-volatile memory 203).

A communication unit 211 is a communication interface. The smartphone 200 can communicate with an external device (the image capture apparatus 100 and the server 300)

using the communication unit 211. The operations of the communication unit 211 are controlled by the control unit 201. The communication unit 211 performs communication with an external apparatus that is compliant with one or more of a known wired communication standard and wireless communication standard. The communication unit 211 includes a circuit (antenna, connector, transceiver, and the like) according to the compliant communication standard.

In the present embodiment, for example, the communication unit 211 includes a wireless communication interface compliant with the wireless LAN (IEEE 802.11 series) standard and a wired communication interface compliant with the USB standard. Note that the standards that the communication unit 211 is compliant with are not limited to these examples.

In the present embodiment, the image capture apparatus 100 and the smartphone 200 perform communication compliant with the PTP-IP standard as set out by the Camera & Imaging Products Association (CPIA). PTP-IP is the abbreviation for Picture Transfer Protocol over TCP/IP networks. PTP-IP is a standard for executing PTP communication in a local area network using communication compliant with the TCP/IP standard.

A public network connection unit 213 is a communication interface with a mobile communications network and is compliant with one or more communication standards (3G, 4G, 5G, and the like) established by the 3rd Generation Partnership Project (3GPP) (registered trademark), for example. Calls can be made and data can be communicated with an external device via the public network connection unit 213.

The smartphone 200 according to the present embodiment can communicate with the server 300 via the communication unit 211 or the public network connection unit 213.

A microphone 214 is used for calling and the input of audio commands. The microphone 214 is included in the operation unit 205 as an input device for audio commands.

A speaker 215 is used for calling and to reproduce audio. Information of Data Files Stored by Image Capture Apparatus 100

FIGS. 4A to 4D are diagrams schematically illustrating a part of file information stored in the storage medium 110 by the image capture apparatus 100. When a data file is written or changed, the file information relating to the target data file is also stored or changed. The file information is stored in a management area of the storage medium 110, for example. Also, one or more of the items of the file information may also be stored as metadata in the data file, for example.

FIGS. 4A to 4D illustrate five items which are items of the file information that relate to the present embodiment. The five items include File name 401, Shooting date and time 402, File size 403, Recording time 404, and Group ID 405. Note that to facilitate understanding, the contents of each item are represented in a format corresponding to the item name. However, in practice, the contents are recorded in a format according to the file system or file format.

File name 401 is a character string provided by the control unit 101 when the data file is generated. The file name includes an extension (MP4, JPG, and the like) indicating the type of data file. With the extension, whether the data file is a still image data file or a moving image data file can be identified. A period is used as a separator before the extension. Also, the control unit 101 provides a prefix starting with "IMG" to the still image data files and a prefix starting with "MVI" to the moving image data files. Also, the control unit 101 provides a number between the prefix and the separator. The number includes a numerical value that starts at an initial value of 1 and increases by 1. The number may include characters that are not numerical values. Also, the naming convention is not limited to this example.

Shooting date and time 402 indicates the time when the generation of the data file was started and is represented in this example using year, month, day, hour, minute, and second. The information of the shooting date and time is also stored as metadata in the data file.

File size 403 indicates the size of the data file in bytes.

Recording time 404 indicates the moving image recording time (duration) in seconds. The recording time is also stored as metadata in the moving image data file.

Group ID 405 is an item for providing a common group ID to a plurality of data files belonging to the same group.

FIG. 4A illustrates an example of file information of four chunk files recorded in the divided mode when shooting moving images. The dividing condition is a recording time of 30 seconds. In a case where the divided mode is set, the control unit 101 provides, as the prefix of the file name, "MVIB" to the first chunk file, "MVIE" to the last chunk file, and "MVID" to the remaining chunk files. Also, the number is a four-digit numerical value that increases by one in order from the number provided to the first chunk file. Zero padding is used so that numerical values of less than four digits are represented as a four-digit numerical value.

Note that in a case where there is one chunk file recorded using divided mode, the prefix of the file name is "MVIB". In a case where the recording time of the chunk file including the prefix "MVIB" in the file name is less than the dividing condition, the chunk file can be recognized as also being the last chunk file. Alternatively, on the basis of the shooting date and time and the dividing condition, if the next chunk file includes the prefix "MVID" or "MVIE" in the file name, the chunk file including the prefix "MVIB" in the file name can be recognized as the last chunk file.

The moving image recording operations for recording the file information illustrated in FIG. 4A are as follows. When a shooting start instruction is detected and moving image recording starts, the control unit 101 records the moving image up until the recording time reaches 30 seconds in the chunk file "MVIB0001. MP4". When the recording time reaches 30 seconds, the control unit 101 finishes recording to "MVIB0001. MP4" and continues recording the moving image data in the new chunk file "MVID0002. MP4". When the recording time reaches 60 seconds, the control unit 101 finishes recording to "MVID0002. MP4" and continues recording the moving image data in the new chunk file "MVID0003. MP4". When the recording time reaches 90 seconds, the control unit 101 finishes recording to "MVID0003. MP4" and continues recording the moving image data in the new chunk file "MVID0004. MP4". Thereafter, when a shooting stop instruction is detected at the point in time when the recording time reaches 115 seconds, the control unit 101 changes the prefix of the file name of the chunk file to "MVIE" and ends the moving image recording. Note that in a case where a data file is not generated until the image data corresponding to the dividing condition is accumulated in the work memory 204, for example, a file name using the prefix "MVIE" is provided at the point in time when the last chunk file is generated.

Note that calculating the file size, obtaining the shooting date and time, and measuring the recording time can be implemented using known methods, and thus a detailed description will be omitted.

FIG. 4B illustrates an example of file information relating to three still image data files recorded according to a single shooting start instruction via shooting in the continuous shooting mode for still image shooting. In a case where the continuous shooting mode for still images is set, the control unit 101 generates a unique group ID for each shooting instruction. Then, the control unit 101 includes a common group ID in the file information of all of the still image data files generated according to the single shooting instruction (for example, while the release switch stays in the fully-pressed state).

In the example illustrated in FIG. 4B, the control unit 101 issues the group ID "CONTINU_001" when a shooting start instruction is detected in a state in which the continuous shooting mode is set. The control unit 101 provides the group ID "CONTINU_001" to the file information of the three still image data files (IMG_0005. JPG to IMG_0007. JPG) recorded in the time up until the shooting instruction is stopped being detected and shooting in the continuous shooting mode ends. Here, the control unit 101 issues a group ID including a combination of the prefix "CONTINU" indicating shooting in the continuous shooting mode and a three-digit numerical value. However, the group ID may be generated using a different convention. Note that the control unit 101 also records the group ID in the still image data file so that a still image data file recording in continuous shooting mode can be handled as a related still image data file.

In a case where a subsequent shooting instruction is detected, the control unit 101 issues a group ID with the number changed from 001 to 002. Note that the control unit 101 can store the last issued group ID in the non-volatile memory 103. By referencing the non-volatile memory 103 when issuing a group ID, the control unit 101 can issue a non-duplicate group ID. The control unit 101 updates the group ID stored in the non-volatile memory 103 with the issued group ID.

FIG. 4C illustrates an example of file information in a case where file break occurs when recording in normal mode when shooting a moving image. Here, the storage medium 110 is formatted in the FAT32 format. In this case, the maximum size of a data file that can be stored in the storage medium 110 is 4 GB. Thus, when the size of the moving image data file being recording approaches 4 GB, the control unit 101 generates a new moving image data file and changes the storage destination of the moving image data to the new moving image data file (file break).

When file break occurs, the moving image corresponding to a single shooting instruction is (divided and) recorded across a plurality of moving image data files. So that moving image data divided when recording can be handled as a series of moving image data, the control unit 101 provides a specific file name to the plurality of data files that jointly store moving image data divided when recording.

Specifically, in order to distinguish from the chunk files recorded in divided mode, the prefix "MVI_" is used for the file name. By generating a number to follow the prefix using a specific rule, the control unit 101 enables the plurality of data files that jointly store the moving image data divided when recording to be identified. Here, the number is a four-digit numerical value, an underscore, and a two-digit numerical value. The four-digit numerical value starts at "0001" and increases by one each shooting instruction. Thus, a common value is provided to the plurality of data files that jointly store the moving image data divided when recording. Note that for the four-digit numerical value, a sequential number may be allocated to the moving image data files recorded in the normal mode irrespective of whether or not file break has occurred.

The two-digit numerical value is a branch number that is increased by one, starting from "01", each time a data file is generated. Note that the number portion may be generated using a different rule. For example, instead of a two-digit numerical value, letters (A, B, C, and the like) may be used.

FIG. 4C illustrates an example of file information in a case where the moving image data recorded according to the execution of a single shooting instruction was divided into four moving image data files due to file breaks when recording. The file names of the four moving image data files have "MVI_0010_" in common but have different two-digit numbers (01 to 04).

Note that it cannot be identified whether or not file break will occur at the point in time when the first file is generated. Thus, the control unit 101 provides a file name without a branch number to the moving image data file first recorded. Thereafter, when file break occurs, the control unit 101 adds a branch number ("_01") to the file name of the moving image data file first recorded. Also, for the moving image data file newly generated, a file name with the branch number ("_02") is provided from the start. For the moving image data file generated thereafter, the control unit 101 provides a file name with the branch number from the start.

FIG. 4D illustrates an example of file information of data files recorded in the single shooting mode for still images and the normal mode for moving images (no file breaks). In this example, two moving images have been recorded after two still images have been shot.

Here, the data files (IMG_0021. JPG and IMG_0022. JPG) of the two still images are first recorded, and thereafter the moving image data files (MVI_0023. MP4 and MVI_0024. MP4) of the two moving images are recorded.

Smartphone Operations upon Image Transfer Application Execution

Next, the operations in the smartphone 200 when an image transfer application (hereinafter, referred to as a transfer application) is executed. The transfer application is an application executed by the control unit 201 in the smartphone 200. The transfer application provides a function that uses the image data included in the image capture apparatus 100 communicatively connected via the communication unit 211. The transfer application, for example, provides a function for transferring data files from the image capture apparatus 100 to the smartphone 200, a function for viewing image data files in the storage medium 110 of the image capture apparatus 100 from the smartphone 200, and the like.

The transfer application also provides a function for transferring image data files included in the image capture apparatus 100 or the smartphone 200 to the server 300 communicatively connected via the communication unit 211 or the public network connection unit 213.

In the transfer application, the rules for providing file names as described above in the image capture apparatus 100 are pre-registered. Thus, both data files storing moving image data divided when recording in the image capture apparatus 100 and related still image data files recorded in the continuous shooting mode in the image capture apparatus 100 can be identified.

Note that for each model of the image capture apparatus 100, the relationship between the data file type and the naming rule may be pre-stored in the transfer application. In this case, on the basis of the image capture apparatus 100 model information obtained in the process of establishing communication with the image capture apparatus 100, the control unit 201 can use the relationship between the data file type and the naming rule as appropriate for the image capture apparatus 100.

FIGS. 5A and 5B illustrate examples of an application screen displayed on the display unit 206 of the smartphone 200 by the control unit 201 executing the transfer application. FIG. 5A illustrates an example of a function selection screen 501 displayed when the transfer application is run, for example. Note that here, the smartphone 200 is at least in a state in which it can communicate with the image capture apparatus 100.

A button 502 provides the function for viewing the image data files stored in the storage medium 110 of the image capture apparatus 100 via the display unit 206 of the smartphone 200. A button 503 provides the function for viewing the image data files stored in the storage medium 210 of the smartphone 200 via the display unit 206. The function selection screen 501 may include buttons for providing other functions. The control unit 201 detects operations of GUI parts such as buttons displayed on the display unit 206 as operations on the operation unit 205.

When an operation (for example, a tap operation) of the button 502 is detected, the control unit 201 communicates with the image capture apparatus 100 and obtains the information necessary for displaying a list of the image data files. The control unit 201 uses the obtained information and displays a list display screen 510, such as that illustrated in FIG. 5B for example, on the display unit 206.

The list display screen 510 displays a list of the image data files stored in the storage medium 110 of the image capture apparatus 100 together with representative images and file information. When an operation of a button 511 is detected, the control unit 201 removes the list display screen 510 and displays the function selection screen 501.

The image data files are displayed according to type, per file, or with a plurality of related files displayed as one file. Each item includes a representative image 512 and file information 513 to 515. Also, an icon 518 or 519 indicating a selected state or a non-selected state is superimposed on the representative image 512. Furthermore, an icon 516 or 517 is superimposed on the representative image 512 in a case where the corresponding item collectively displays a plurality of data files.

The representative image 512 is a thumbnail image (scaled down image) of the image data file. In the case of a moving image data file, the image of the first frame may be used, for example. As the file information, name 513, shooting date and time 514, and recording time 515 (only in the case of a moving image) are displayed.

The icon 516 is displayed on chunk file items. The icon 517 is displayed on items of image data files storing moving image data divided when recording due to file break. The icon 518 or 519 is displayed on each of the items. The icon 518 is displayed on icons in a selected state, and the icon 519 is displayed on icons in a non-selected state. Each time a select or non-select operation (for example, a tap operation) of an item is detected, the control unit 201 displays the icon 518 or 519 according to the selected state of the item.

In a state in which the list display screen 510 is displayed, when an instruction to execute processing (for example, display or transfer) on an image data file is detected, the control unit 201 executes the instructed processing on the image data files corresponding to items in the selected state. Note that the type of processing and the execution instruction input method is not particularly limited, and any known method may be used. For example, execution instruction buttons corresponding to processing types may be provided on the list display screen 510, or a menu screen may be displayed for selecting the processing to execute in response a specific operation (for example, a long press) on the list display screen 510.

Note that in a case where an item of a chunk file or an item of an image data file storing moving image data divided when recording due to file break is in a selected state, the control unit 201 also includes related data file(s) not displayed on the list display screen 510 as targets for processing. The related data file(s) is/are one or more data files that, together with a data file being displayed on the list display screen 510 with the icon 516 or 517, stores a continuous moving image.

List Display Screen Generation Operation

Next, the operations performed to display the list display screen 510 in the smartphone 200 will be described using the flowchart illustrated in FIG. 6. The following operations are performed by the control unit 201 in response to an operation of the button 502 being detected while the function selection screen 501 is displayed.

In step S601, the control unit 201 obtains list information of the image data files from the image capture apparatus 100. Specifically, the control unit 201 transmits a command requesting list information to the image capture apparatus 100 via the communication unit 211. The control unit 101 of the image capture apparatus 100, in response to the command, transmits information relating to the data files stored in the storage medium 110 to the smartphone 200 via the communication unit 111. The exchange between the control unit 201 and the control unit 101 relating to obtaining information relating to the data files stored in the storage medium 110 and the data files can be performed using a command (operation) compliant with PTP, for example.

The list information obtained in step S601 may be a list of the files illustrated in FIGS. 4A to 4D, for example. The list information is generated in step S804 of FIG. 8 by the control unit 101 of the image capture apparatus 100 and transmitted to the smartphone 200 in step S809. Here, to make processing easier, the list information is sorted by oldest to newest shooting date and time. Note that the sorting of the list information may be performed by the control unit 101 before transmission or may be performed by the control unit 201 after reception.

The control unit 201 stores the list information obtained from the image capture apparatus 100 in the work memory 204. Then, the control unit 201 executes the following operations of steps S602 to S606 on each of the data files on the basis of the list information.

In step S602, the control unit 201 determines whether or not the data file is a chunk file. If the control unit 201 determines that the data file is a chunk file, step S604 is executed. Otherwise, step S603 is executed. The control unit 201 determines whether or not the data file is a chunk file on the basis of the file name. As described using FIG. 4A, the image capture apparatus 100 records chunk files with a file name starting with "MVIB", "MVID", or "MVIE". Thus, the control unit 201 determines that a data file with a file name starting with either of these prefixes is a chunk file.

In step S603, the control unit 201 determines whether or not the data file is a file storing moving image data divided when recording due to file break. If the control unit 201 determines that the data file is a file storing moving image data divided when recording due to file break, step S604 is executed. Otherwise, step S605 is executed. The control unit 201 determines whether or not the data file is a file storing moving image data divided when recording due to file break on the basis of the file name. As described above using FIG.

4C, in a case where the image data is divided when recording due to file break, the image capture apparatus 100 records each data file with a file name with a branch number (for example, "_01", "_02", and the like). Accordingly, the control unit 201 determines that a data file with a file name including a branch number is a file storing moving image data divided when recording due to file break.

Step S604 is executed in a case where the data file is determined to be one of the plurality of data files each storing a different part of a continuous moving image. The control unit 201 determines whether or not the data file targeted for processing is, of the plurality of data files each storing a different part of a continuous moving image, the first recorded data file. If the control unit 201 determines that the data file targeted for processing is, of the plurality of data files each storing a different part of a continuous moving image, the first recorded data file, step S605 is executed. Otherwise, step S606 is executed. The control unit 201 performs the determination on the basis of the file name of the data file targeted for processing. Specifically, the control unit 201 determines a data file with a file name that includes "MVIB" as the prefix or "01" as the branch number to be, of the plurality of data files each storing a different part of a continuous moving image, the first recorded data file.

In step S605, the control unit 201 adds information of the data file targeted for processing to a display list. The display list is a list storing file information for each of the data files displayed on the list display screen 510, and the display list is stored in the work memory 204 by the control unit 201. The items of the file information stored in the display list may be different from the format of the list display screen 510. Here, to generate the list display screen 510 illustrated in FIG. 5B, the control unit 201 stores the file name, the shooting date and time, and the recording time of the file information in the display list. Also, in addition to the file information, the control unit 201 also stores information relating to the display type in the display list. The display list will be described below using FIG. 7. In this manner, for the plurality of data files each storing a different part of a continuous moving image, only the first recorded data file is added to the display list.

In step S606, the control unit 201 adds the recording time of the data file targeted for processing to the recording time of the data file most recently added to the display list. Step S606 is executed in a case where the data file targeted for processing is, of the plurality of data files each storing a different part of a continuous moving image, a data file recorded second or thereafter. As described above, the file information is sorted by oldest to newest shooting date and time. Accordingly, the data file that step S606 is executed on and the data file most recently added display list are data files each storing a different part of the same continuous moving image.

Via step S606, the recording time of the data file included in the display list that is, of the plurality of data files each storing a different part of a continuous moving image, the first recorded data file is sequentially updated until the recording time of the entire moving image stored across the plurality of data files is reached. Note that instead of identifying the data file most recently added to the display list, the data file targeted for recording time updating may be identified from the display list on the basis of the naming rule of the file name.

The processing of steps S602 to S606 is executed on all of the data files, and the control unit 201 executes step S607.

An example of a display list will now be described using FIG. 7. FIG. 7 schematically illustrates a display list stored by the control unit 201 in the work memory 204 for generating a list display screen. In FIG. 7, a table format is used to facilitate understanding, but the format for storing each piece of data forming the display list in the work memory 204 is not limited.

The display list includes the items Display name 701, Shooting date and time 702, Recording time 703, and Display type 704 for each of the data files targeted for display. From the display list, blank items are where data is not recorded or where specific data indicating that no data exists is recorded.

Display name 701 is the name of the file displayed on the list display screen 510. In this example, the file name is used unchanged except for data files storing moving image data divided when recording due to file break. For data files storing moving image data divided when recording due to file break, the file name excluding the branch number is used as the display name.

Shooting date and time 702 is the shooting date and time included in the file information. In Recording time 703, significant data is stored only for moving image data files. For chunk files or data files storing moving image data divided when recording due to file break, the value for Recording time 703 is recording time of the entire plurality of data files and not the recording time of one data file corresponding to the display name.

Display type 704 stores a value indicating the type in the case of a chunk file or a data file storing moving image data divided when recording due to file break. In FIG. 7, a character string representing the type is displayed. However, in practice, a value of another model is stored. For example, "1" may be stored in the case of a chunk file and "2" may be stored in the case of a data file storing moving image data divided when recording due to file break.

When a data file corresponding to file information illustrated in FIGS. 4A to 4D is stored in the storage medium 110, the control unit 201 executes the operations of steps S601 to S606 and obtains the display list illustrated in FIG. 7.

Specifically, for a chunk file group corresponding to the file information of FIG. 4A, only the first recorded chunk file "MVIB0001. MP4" is added to the display list. "Chunk file" is stored in Display type 704. Recording time 703 is 1 minute and 55 seconds, as the recording time (30 seconds, 30 seconds, 25 seconds) of the three remaining chunk files are sequentially added in step S606 to the 30 second recording time of "MVIB0001. MP4".

The continuously shot still image data file group ("IMG_0005. JPG", "IMG_0006. JPG", "IMG_0007. JPG") corresponding to the file information of FIG. 4B do not correspond to data files each storing a different part of a continuous moving image. Thus, all of the data files are added to the display list.

Note that the control unit 201 may store the group ID in the display type for a still image data file group including the same group ID. Also, the control unit 201 can superimpose a specific icon on the list display screen 510 for data file groups with the same group ID stored in the display type. Accordingly, on the list display screen 510, the user can easily identify a continuously shot still image data file group.

For a group of moving image data files storing moving image data divided when recording due to file break corresponding to the file information of FIG. 4C, as with the chunk files, only the first recorded data file "MVI_0001_01. MP4" is added to the display list. For data files storing moving image data divided when recording due to file break, the file name "MVI_0001. MP4" with the branch number removed as stored in Display name 701. Note that a file name including a branch number may be used as the display name.

"File break" is stored in Display type 704. Recording time 703 is 17 minutes and 40 seconds, since, in step S606, the respective recording times (4 minutes and 40 seconds, 4 minutes and 41 seconds, 3 minutes and 39 seconds) of the three remaining data files storing moving image data divided when recording are sequentially added to the 4 minutes and 40 seconds recording time of "MVI_0010. MP4".

The image data file group corresponding to the file information of FIG. 4D does not correspond to data files each storing a different part of a continuous moving image. Thus, all of the data files are added to the display list.

Returning to FIG. 6, in step S607, the control unit 201 obtains thumbnail image data for the image data files included in the display list from the image capture apparatus 100. Note that in a case where a thumbnail image is included in the file list information obtained in step S601, the control unit 201 obtains the necessary thumbnail image data from the work memory 204.

In step S608, the control unit 201 uses the display list and the thumbnail image data obtained in step S607 to generate display data for the list display screen 510. Then, by storing the display data in the video memory area of the work memory 204, the control unit 201 displays the list display screen 510 on the display unit 206.

On the basis of Display name 701, Shooting date and time 702, and Recording time 703 in the display list, the control unit 201 generates Name 513, Shooting date and time 514, and Recording time 515 for the list display screen 510. Also, Display type 704 in the display list is used in controlling the display of the icons 516 and 517.

By executing the operations described above, the control unit 201 displays a list display screen of data files stored in the storage medium 110 of the image capture apparatus 100 on the display unit 206. Accordingly, the user of the smartphone 200 can view the data files included in the image capture apparatus 100 on the smartphone 200 and transfer the data files to the smartphone 200 (or the server 300).

According to the present embodiment, when generating a list display screen for data files stored in the image capture apparatus 100, a plurality of data files each storing data of a different part of a continuous moving image are displayed as a single data file. At this time, by displaying the total recording time of the plurality of data files for the recording time, the user can easily comprehend the recording time as it is recorded in a similar manner to how a single moving image data file is recorded.

Also, by attaching a specific indicator (for example, an icon) to an item corresponding to a plurality of data files each storing data of a different part of a continuous moving image, the user can more clearly comprehend that operations can be collectively performed on the related plurality of data files. In a case where the item selected in the list display screen corresponds to a plurality of data files, the control unit of an electronic device (smartphone 200) displaying the list display screen sets other related data files not displayed in the list display screen as processing targets.

Take an example in which, on the list display screen 510 illustrated in FIG. 5B, the item corresponding to name "MVIB0001. MP4" is in a selected state. In this example, the control unit 201 handles the non-displayed related data files "MVID0002. MP4", "MVID0003. MP4", and MVIE0004. MP4" also as being selected.

By not displaying the related data files, complicating the list display screen 510 can be avoided. Also, a plurality of data files each storing a different part of continuous moving image can be selected and deselected via operation of a single item, improving the ease of use.

For continuously shot still image data files, each of the data files are displayed on the list display screen 510. Thus, the user can easily select only the necessary data files from among the plurality of data files storing a plurality of similar images by comparing the thumbnail images, for example.

In this manner, by having different display methods for a plurality of related data files depending on the data file type, according to the present embodiment, user-friendliness can be greatly enhanced. Note that an effect of the present disclosure is at least obtained by displaying a plurality of data files each storing data of a different part of a continuous moving image as a single item or file. The individual display of the continuously shot still image data files are not required.

Operation of Image Capture Apparatus 100

Figure 8:
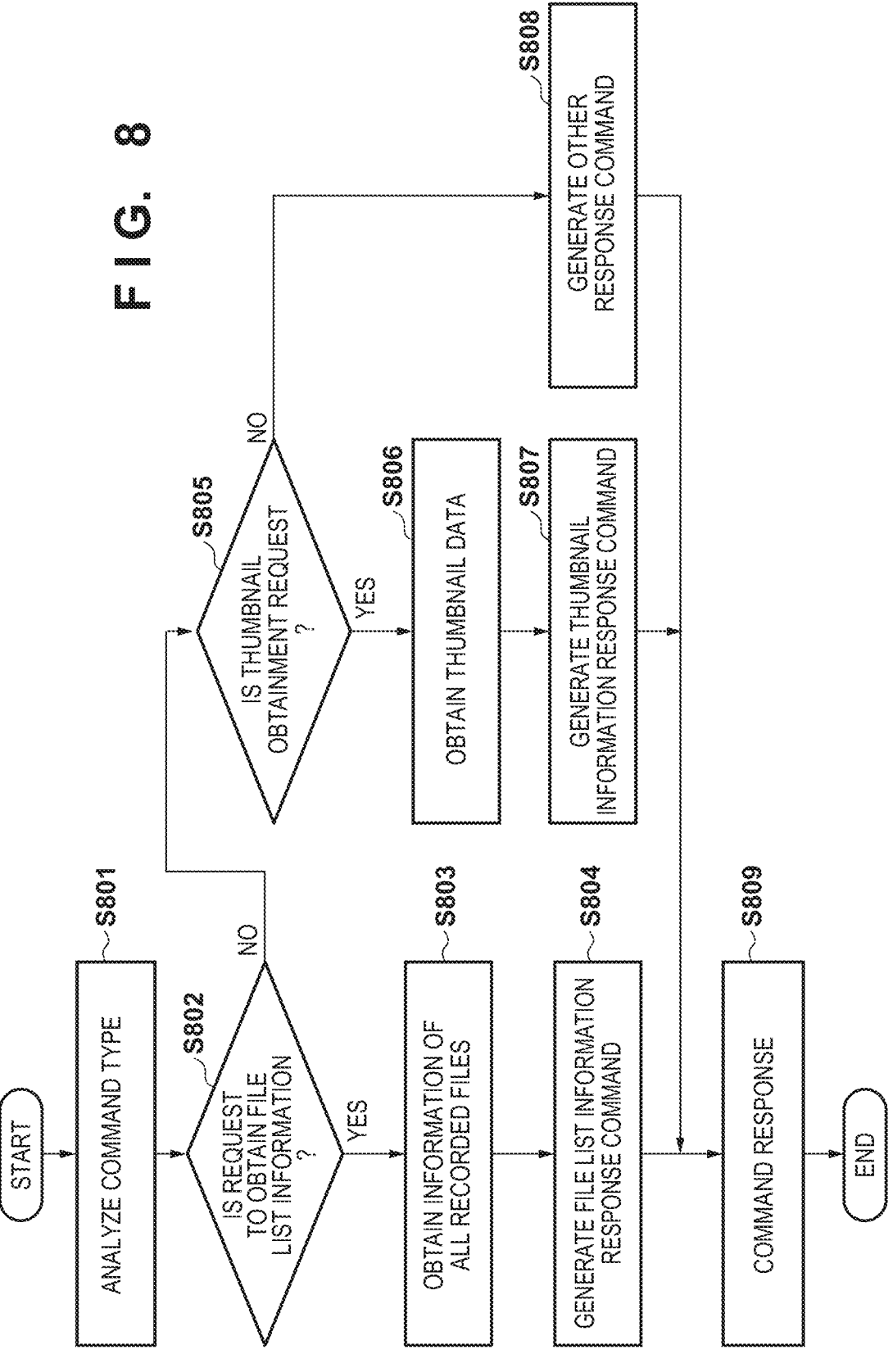
FIG. 8 is a flowchart relating to the operations of the image capture apparatus according to the embodiment.

Next, the operations of the image capture apparatus 100 corresponding to the operations of the smartphone 200 described using FIG. 6 will be described using the flowchart illustrated in FIG. 8. The following operations are executed by the control unit 101 in response to receiving a command from an external device (smartphone 200) that can communicate via the communication unit 111.

In step S801, the control unit 101 analyzes the type of command received from the external device via the communication unit 111.

In step S802, the control unit 101 determines whether or not the received command is a request to obtain file list information. If the control unit 101 determines that the received command is a request to obtain file list information, step S803 is executed. Otherwise, step S805 is executed.

In step S803, the control unit 101 obtains the information of all of the data files stored in the storage medium 110.

In step S804, the control unit 101 generates a data file identification ID from the information of the obtained data files. Then, the control unit 101, for each data file, generates file list information with the identification ID associated with the file information (for example, file name, shooting date and time, file size, recording time, group ID) as a response command. Note that the identification ID is used when transmitting a command designating a data file from an external device. Note that the number and type of items of the file information included in the response command can be set as desired. Also, only the file name, for example, may be used as an item of the file information included in the response command, and other items may be included in a response depending on a request from an external device or obtains at a timing different from when step S803 is executed.

In step S805, the control unit 101 determines whether or not the received command is a thumbnail obtainment request. If the control unit 101 determines that the received command is a thumbnail obtainment request, step S806 is executed. Otherwise, step S808 is executed.

In step S806, the control unit 101 obtains the data of the thumbnail images of the data files corresponding to the identification IDs included in the thumbnail obtainment request.

In step S807, the control unit 101 generates a response command including data of the thumbnail images obtained in step S806.

In step S808, the control unit 101 executes processing corresponding to the command type and generates a response command. Note that the operations of step S808 can be implemented using a known method not directly related to the present embodiment. Thus, the methods will not be described in detail herein.

When a response command is generated in step S804, S807, or S808, the control unit 101 executes step S809.

In step S809, the control unit 101 transmits the response command to an external device (smartphone 200) that is the transmission source of the request command via the communication unit 111.

Other Embodiments

In the configuration according to the embodiment described above, a list display screen of data files stored in the image capture apparatus 100 is generated at an external device (smartphone 200) that can communicate with the image capture apparatus 100. However, the device including the data files targeted for the list display screen may be the same device that generates the list display screen.

For example, the list display screen generation operation described as an operation of the smartphone 200 may be executed by the image capture apparatus 100. Alternatively, a list display screen of data files pre-stored in a storage apparatus of a computing device may be generated as described in the embodiment described above via the computing device. Also, the device that generates the list display screen may not include a function for transferring data files targeted for the list display screen to an external device.

Also, the plurality of data files each storing a different part of a continuous moving image may be distinguished on the basis of information other than the file name. For example, information indicating a chunk file and information indicating a data file storing moving image data divided when recording due to file break may be included in the data file as metadata. Such information may also include information indicating the ordinal number of a data file from a plurality of related data files. In the case of generating a list display screen, by referencing the metadata of each data file, a chunk file or a data file storing moving image data divided when recording due to file break can be identified. Note that the method for distinguishing the type of data file may be pre-registered in the application that generates the list display screen.

Also, on the list display screen, a continuously shot plurality of still image data files may be collectively displayed in one item (as one data file). In this case, when the item (file) corresponding to the continuously shot plurality of still image data files is selected, the list display screen is changed to display each of the still image data files. In particular, in a case where there are many continuously shot still image data files (equal to or greater than a threshold), by collectively displaying these, a decrease in the ease of use due to the continuously shot still image data files taking up too much of the list display screen can be reduced. In this case, for a chunk file or a moving image data file storing moving image data divided when recording due to file break, the display and selection of an individual data file is made unable to be performed.

Also, in a case where continuously shot still image data files are collectively displayed in one item, as with the recording time in the moving image data file, the total size of the sizes of the plurality of related still image data files may be displayed on the list display screen.

Also, in the embodiment described above, only one thumbnail image is displayed for data files collectively displayed as one item. However, the thumbnail images of the plurality of related data files may be displayed overlapped in order. Also, instead of obtaining the data of the thumbnail images, the image data files may be obtained and larger images may be displayed.

Also, in the embodiment described above, in the list display screen, chunk files and moving image data that jointly store moving image data divided when recording due to file break are attached with different indicators. However, the files may be not distinguished between by attaching a common indicator.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-107224, filed Jun. 29, 2023, which is hereby incorporated by reference herein in its entirety.

What is claimed is:

1. An image processing apparatus that comprises one or more processors executing a program stored in a memory to:
 obtain information relating to each of a plurality of data files that have been recorded; and
 generate, based on the information, a selection screen for selecting a data file from the plurality of data files,
 wherein the selection screen is generated to display, a plurality of thumbnail images corresponding to the plurality of data files that jointly store continuous moving image data, each thumbnail image from the plurality of thumbnail images is displayed as a single data file, an icon identifying whether the data file (i) was recorded in a mode in which moving image data is divided according to a predetermined dividing condition and recorded into a plurality of data files or (ii) have been divided due to a file system limitation, wherein the icon is superimposed on a thumbnail image from the plurality of thumbnail images that is associated with moving image data.

2. The image processing apparatus according to claim 1, wherein the plurality of data files that jointly store continuous moving image data are data files generated in response to a single shooting instruction.

3. The image processing apparatus according to claim 2, wherein the plurality of data files that jointly store continuous moving image data are data files recorded in a mode in which moving image data is recorded into one or more data files according to a predetermined dividing condition.

4. The image processing apparatus according to claim 2, wherein the plurality of data files that jointly store continuous moving image data are data files that have been divided due to a file system limit.

5. The image processing apparatus according to claim 1, wherein the plurality of data files that jointly store continuous moving image data is determined to (i) have been recorded in a mode in which moving image data is divided according to a predetermined dividing condition and recorded into a plurality of data files or (ii) have been divided due to a file system limitation, based on file names included in the information.

6. The image processing apparatus according to claim 1, wherein the selection screen is generated to display, the plurality of data files that jointly store continuous moving image data, as a single data file whose total recording time is a sum of recording times of the plurality of data files.

7. The image processing apparatus according to claim 1, wherein the selection screen is generated to display a plurality of data files of continuously shot still images individually.

8. The image processing apparatus according to claim 1, wherein the selection screen is generated to display, a plurality of data files of continuously shot still images, also as a single data file.

9. The image processing apparatus according to claim 8, wherein in a case where one data file corresponding to the plurality of data files of the continuously shot still images is selected on the selection screen, the selection screen is changed to display each of the plurality of data files of the continuously shot still images.

10. The image processing apparatus according to claim 9, wherein in a case where one data file corresponding to the plurality of data files that jointly store continuous moving image data is selected on the selection screen, the selection screen is not changed to display each of the plurality of data files that jointly store continuous moving image data.

11. The image processing apparatus according to claim 1, wherein the one or more processors further function as a controlling unit configured to execute processing a data file selected on the selection screen, and
 in a case where a single data file representing the plurality of data files that jointly store continuous moving image data is selected on the selection screen, the controlling unit executes the processing on the plurality of data files that jointly store continuous moving image data as a selected target.

12. The image processing apparatus according to claim 1, wherein information of a plurality of data files recorded in an external apparatus that communicate with the image processing apparatus is obtained.

13. An image processing method executed by an image processing apparatus comprising:
 obtaining information relating to each of a plurality of data files that have been recorded; and generating, based on the information, a selection screen for selecting a data file from the plurality of data files, wherein the selection screen is generated to display, a plurality of thumbnail images corresponding to the plurality of data files that jointly store continuous moving image data, each thumbnail image from the plurality of thumbnail images is displayed as a single data file, an icon identifying whether the data file (i) was recorded in a mode in which moving image data is divided according to a predetermined dividing condition and recorded into a plurality of data files or (ii) have been divided due to a file system limitation, wherein the icon is superimposed on a thumbnail image from the plurality of thumbnail images that is associated with moving image data.

14. A non-transitory computer-readable medium storing a program which causes, when executed by a computer, the computer to execute an image processing method comprising:

obtaining information relating to each of a plurality of data files that have been recorded; and generating, based on the information, a selection screen for selecting a data file from the plurality of data files, wherein the generating generates the selection screen so as to display, a plurality of thumbnail images corresponding to the plurality of data files that jointly store continuous moving image data, each thumbnail image from the plurality of thumbnail images is displayed as a single data file, an icon identifying whether the data file (i) was recorded in a mode in which moving image data is divided according to a predetermined dividing condition and recorded into a plurality of data files or (ii) have been divided due to a file system limitation, wherein the icon is superimposed on a thumbnail image from the plurality of thumbnail images that is associated with moving image data.

* * * * *